Figure 1:
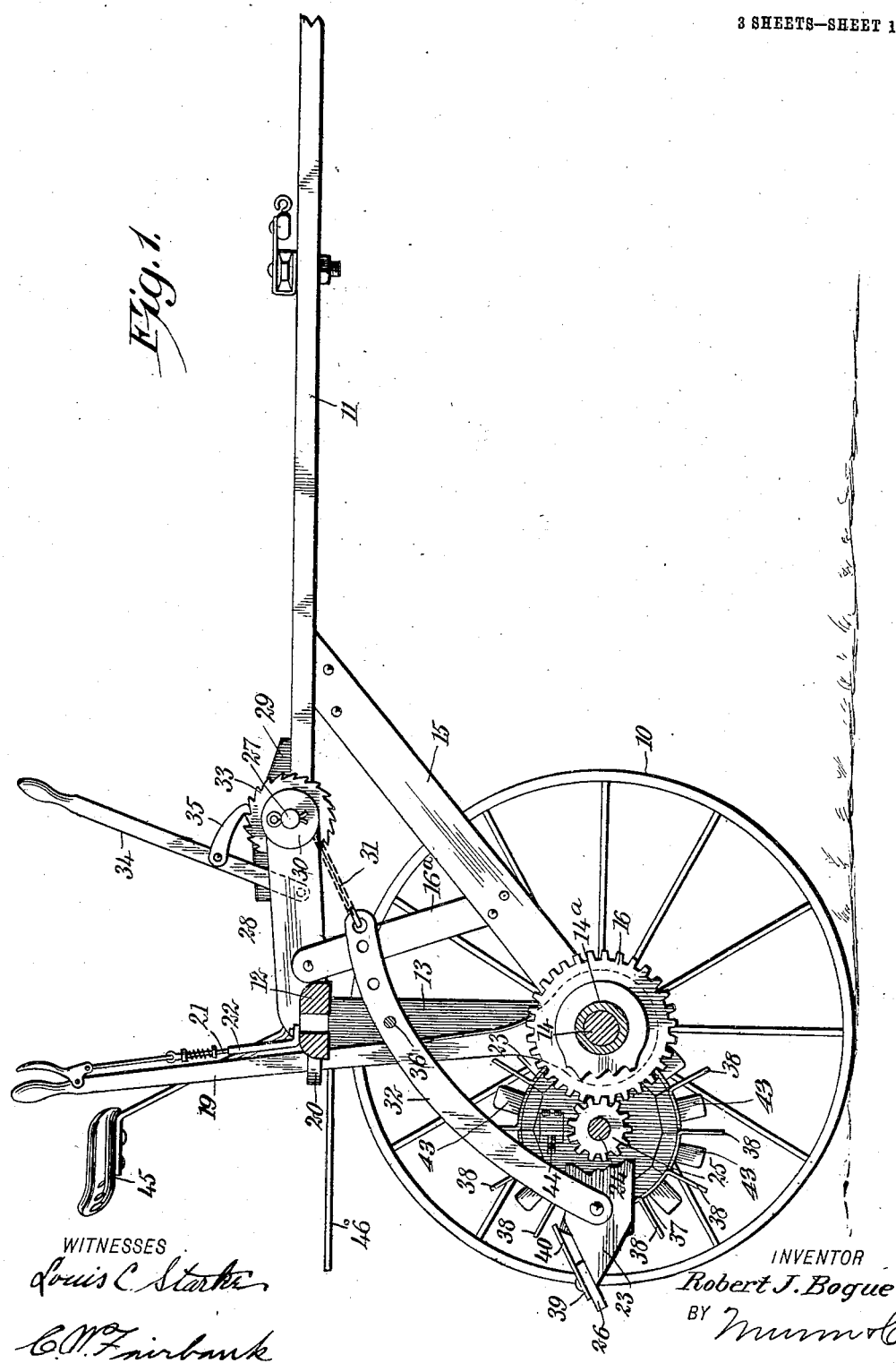

No. 891,661. PATENTED JUNE 23, 1908.
R. J. BOGUE.
STALK PULLER, SEEDER, AND PULVERIZER.
APPLICATION FILED APR. 10, 1907.

3 SHEETS—SHEET 1.

WITNESSES

INVENTOR
Robert J. Bogue
BY
ATTORNEYS

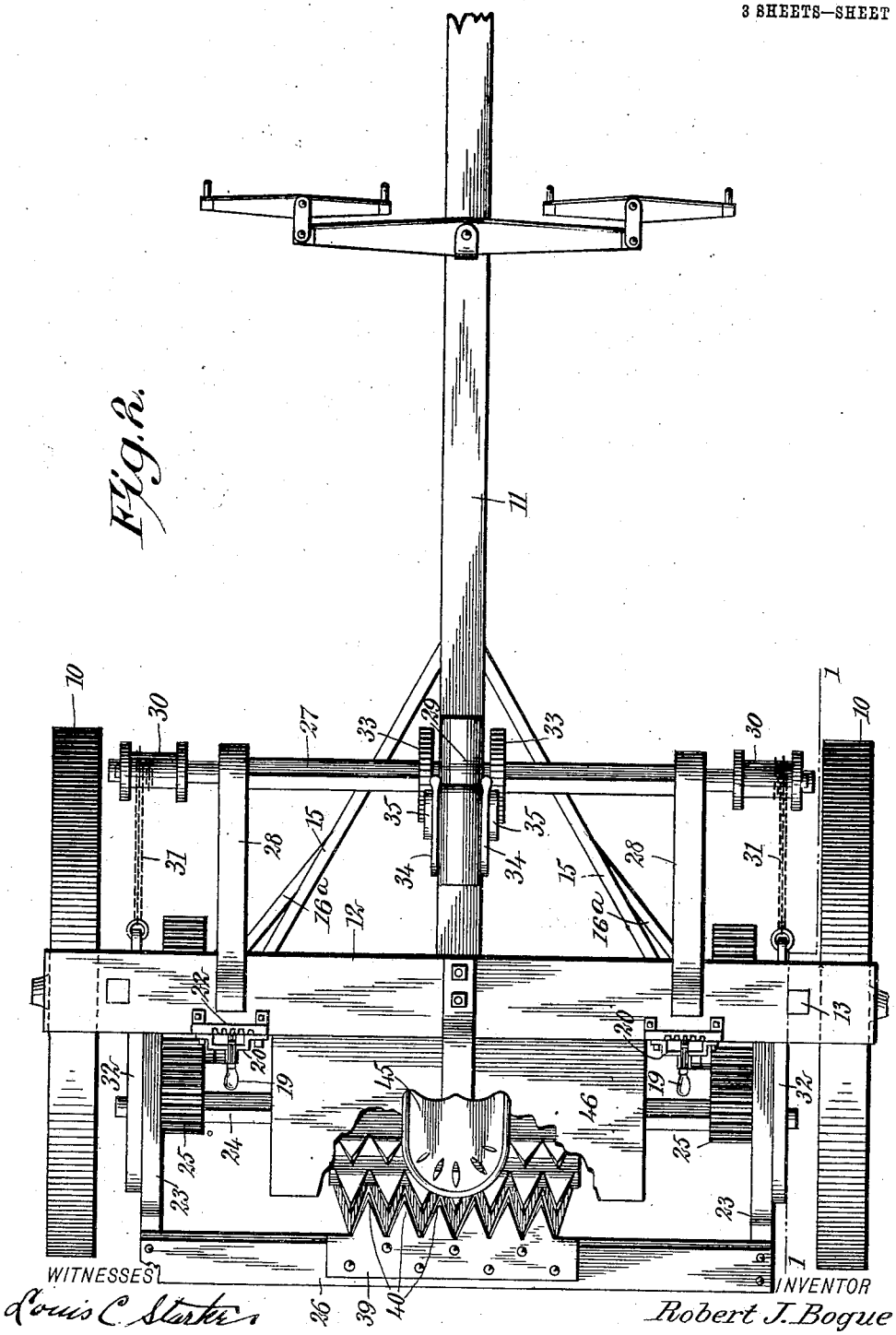

No. 891,661.
PATENTED JUNE 23, 1908.
R. J. BOGUE.
STALK PULLER, SEEDER, AND PULVERIZER.
APPLICATION FILED APR. 10, 1907.
3 SHEETS—SHEET 3.
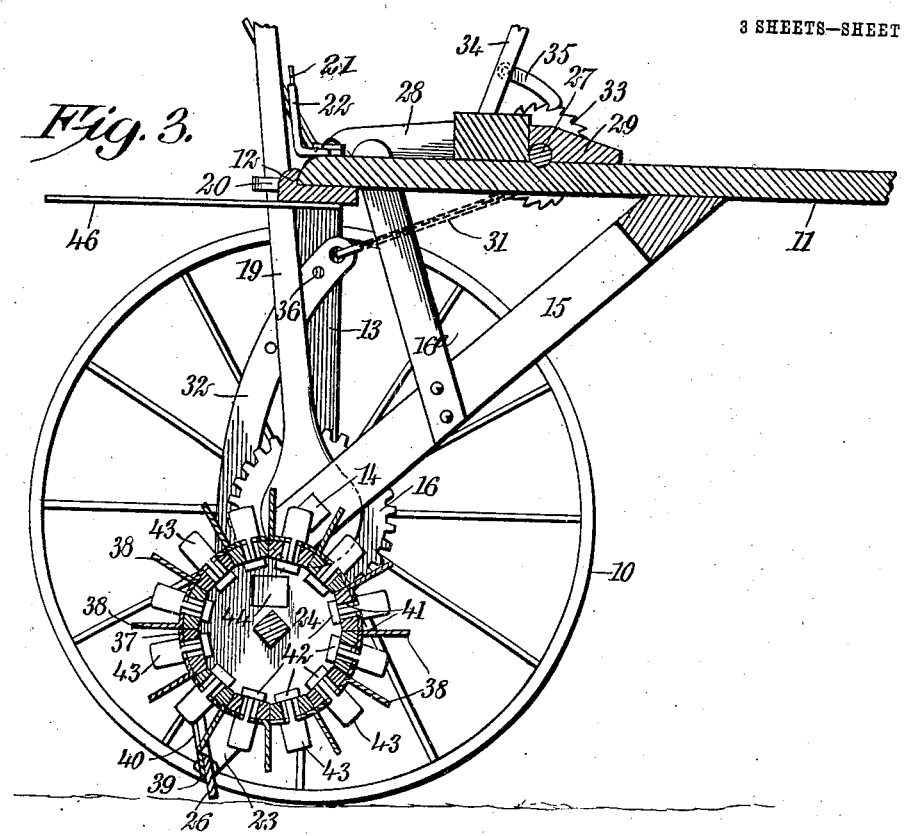
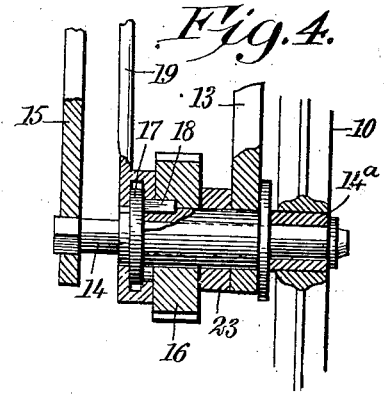
WITNESSES
INVENTOR
Robert J. Bogue
BY
ATTORNEYS

UNITED STATES PATENT OFFICE.

ROBERT JACKSON BOGUE, OF PARIS, TEXAS.

STALK-PULLER, SEEDER, AND PULVERIZER.

No. 891,661.    Specification of Letters Patent.    Patented June 23, 1908.

Application filed April 10, 1907. Serial No. 367,362.

*To all whom it may concern:*

Be it known that I, ROBERT JACKSON BOGUE, a citizen of the United States, and a resident of Paris, in the county of Lamar and State of Texas, have invented a new and Improved Stalk-Puller, Seeder, and Pulverizer, of which the following is a full, clear, and exact description.

This invention relates to certain improvements in agricultural implements, and more particularly to an implement designed for pulling corn stalks, cotton stalks, or the like, for pulverizing the ground, and for seeding and planting.

The invention consists in certain features of constructions and combination of parts, all of which will be fully set forth hereinafter and particularly pointed out in the claims.

Reference is to be had to the accompanying drawings forming a part of this specification, in which similar characters of reference indicate corresponding parts in all the figures, and in which Figure 1 is a side elevation of a device embodying my invention, a portion thereof being shown in section on the line 1—1 of Fig. 2; Fig. 2 is a plan view, a portion thereof being broken away; Fig. 3 is a central longitudinal section; and Fig. 4 is a longitudinal section through the parts in engagement with one of the axles.

In the specific form of my improved implement illustrated in the accompanying drawings, I provide main wheels 10 adapted to support the frame of the operating mechanism, and having connected thereto a draft pole 11, or other means whereby the implement may be moved. The frame preferably comprises a transverse beam 12 of a length substantially equal to the width of the machine and having posts 13 depending therefrom adjacent each end thereof. The axle of the machine is preferably formed in two parts 14, 14, each operatively connected to the working mechanism and each journaled in the lower end of the oppositely-disposed posts 13. For supporting the inner ends of the two axle members 14, 14, I provide forwardly-extending braces 15, 15, the front ends of which converge and are united to the draft pole 11. Intermediate the ends of each of these braces, I provide additional braces 16ª extending upward and joining the draft pole adjacent the connection between the latter and the transverse beam 12. The parts above described constitute the main frame of the implement, and operatively mounted within this frame is the means for securing the objects sought.

The axle members 14 are each provided with a sleeve 14ª, to the outer end of each of which is keyed or otherwise rigidly secured the corresponding wheel 10, and adjacent the inner end of each sleeve is a gear wheel 16 having clutch mechanism, whereby it may be connected to or disconnected from said sleeve. This mechanism preferably comprises a collar 17 having a key 18 carried thereby and longitudinally movable within a keyway in the sleeve 14ª. The gear wheel 16 is provided with a groove into which the key 18 may pass when the groove is in alinement with the keyway of the sleeve. A suitable lever handle 19 is provided in engagement with the collar 17, whereby the latter may be moved longitudinally, and the upper end of the handle lever extends to the upper portion of the implement and is pivotally mounted within a bracket 20 on the transverse beam 12. The handle lever may, if desired, be provided with a spring-pressed dog 21 engaging with a toothed plate 22 for holding the handle lever and clutch in the desired position. With the handle lever moved to one extreme position, the key 18 is withdrawn from the gear wheel and the sleeve may freely rotate without rotating said gear wheel, but with the handle lever moved to the opposite limiting position, the gear wheel is caused to rotate simultaneously with said sleeve and the corresponding main wheel 10.

Pivotally mounted upon each sleeve and rearwardly-extending therefrom is an arm 23 provided with means for raising and lowering the outer end thereof, and supported by the two arms is a shaft 24 upon which is mounted the drum 37, which forms the subject matter of a separate application, filed Jan. 6, 1908, Serial No. 409,538. The shaft is adapted to be rotated by pinions 25 mounted thereon and engaging with the pinions 16, whereby as the machine is moved along and the main wheels rotated, the motion is imparted from said wheels through the sleeves 14ª, gear wheels 16 and pinions 25 to the shaft 24 and drum carried thereby. The outer ends of the arms 23 are connected together by a board 26, hereinafter referred to as the "shedding board", which is provided with teeth engaging with those of the drum, and also serves to secure the simultaneous movement of the two arms. For raising and lowering the arms, I provide a transverse shaft 27 located in front of the main transverse beam 12 and substantially parallel thereto, said shaft being provided with means for rotating the same and means operatively connecting it to the ends of the arms 23. For supporting the shaft at its ends, I preferably provide rearwardly extending bars 28, each having the rear end thereof rigidly secured to the transverse beam 12, and for supporting the shaft intermediate its ends, I provide a journal box 29 mounted on the draft pole 11. The outer ends of the shaft 27 carry drums 30 having chains 31 wound thereon and connected to links 32. These links have their rear ends pivotally connected to the arms 23 and are provided with means whereby they may be rigidly secured to the adjacent posts 13 to hold the arms at any desired elevation. I may provide any suitable mechanism for rotating the shaft 27, but preferably this mechanism comprises two ratchet wheels 33 mounted adjacent the draft pole 11, and two lever arms 34 carrying pawls 35 in engagement with said ratchet wheels. By moving the lever arms 34 in succession, the shaft may be rotated and the rear ends of the arms raised to any desired extent. For holding the arms in their raised position, I may, if desired, provide the links 32 with a series of openings adjacent their upper ends and provide pins 36 adapted to pass through said openings and engage with the posts 13.

The drum, which is rigidly secured to the shaft 24, is hollow and is provided with a series of teeth 38 extending outward radially therefrom. The shedding board 26 is provided with a plate 39 rigidly secured thereto and having teeth 40 corresponding in size and position to those upon the drum, and adapted to mesh with said teeth as the drum is rotated. As previously stated, the teeth 38 of the drum extend radially, but the teeth 40 of the plate 39 extend substantially tangentially to the body of the drum, whereby as the teeth of the drum pass between those of the shedding board all foreign matter interspersed between the first mentioned teeth will be removed and will drop from the machine at the outer side of the shedding board. The drum is provided with slots 41 extending longitudinally thereof and communicating with the interior chamber of the drum. For controlling each of the slots, I provide interior longitudinally movable plates 42 adjacent each of the slots and having an arm or operating handle 43 extending outwardly therefrom.

The drum is adapted to contain the seeds when the device is employed as a planter or seeder, and one end of the drum is provided with any suitable filling opening and closure 44 therefor. When employing the device as a seeder, the drum is filled and lowered to such a position that the teeth enter the ground and displace a portion thereof. The teeth at the lower side of the drum move forward as the drum rotates and while each tooth is forming a small furrow in the ground the seeds pass outward through the opening back of the lowermost row of teeth and fall into the furrows formed by the teeth. The next row of teeth serve to cover up the seeds already dropped and to form pockets or furrows for the seeds dropped through the next opening. By moving the plates 42 the size of the openings in the wall of the drum may be readily controlled and the quantity of seed dropped at each revolution of the drum thus controlled. If desired, the seeds may be omitted from the drum and the drum lowered to a still further extent, so that the successive series of teeth intersect the ground and serve to pulverize the same, while the board 26 following the teeth serves to remove any unevenness caused by the teeth.

In employing the device as a stalk-puller, the drum is raised to the desired elevation, so that as the implement is drawn along the stalks enter the recesses between the teeth on the front side of the drum, and as the teeth at this point are continually moving upward, the stalks are caught in the sharp angles between the teeth and pulled out of the ground. After the stalks have traveled up with the front side of the drum and across the top thereof, they are removed from the drum by the teeth 40 on the shedding board.

In connection with the implement above described, various attachments or parts may be employed, and various changes may be made in the specific construction illustrated. The device may be provided with a seat 45 for the operator, which seat may, if desired, be mounted upon the transverse beam 12. The levers 34 and 19 are illustrated as adapted to be operated by hand, but may, if desired, terminate in foot levers in front of and below the seat 45. Guide plates may, if desired, be provided to direct the stalks into engagement with the operating drum, and various protecting plates may be provided for preventing the drum from throwing the dirt or stalks. As shown, I have illustrated such a plate 46 directly below the seat 45 and serving to not only prevent the drum from throwing dirt upward toward the operator, but also serving as a platform upon which small articles may be placed.

Having thus described my invention, I claim as new and desire to secure by Letters Patent:

1. In a device of the class described, a main frame, a non-rotatable two-part axle carried thereby, sleeves rotatably mounted upon the respective parts of said axle, main wheels secured to said sleeves, pivotally mounted arms, a drum carried by said arms, and means operatively connecting said sleeves and said drum whereby the drum is rotated by the rotation of said main wheels.

2. In a device of the class described, a main frame, a two-part axle mounted therein, sleeves rotatably mounted upon the respective parts of said axle, main wheels secured to said sleeves, arms pivotally mounted upon said sleeves, a rotatably mounted drum carried by said arms and operatively connected to said sleeves, a plurality of outwardly extending pointed teeth carried by said drum, and a shedding board carried by said arms at their outer ends.

In testimony whereof I have signed my name to this specification in the presence of two subscribing witnesses.

ROBERT JACKSON BOGUE.

Witnesses:
C. N. ALLEN,
H. H. LENNOX.